United States Patent [19]

Meyer

[11] Patent Number: 4,702,491

[45] Date of Patent: Oct. 27, 1987

[54] QUICK DISCONNECT THREE POINT SAFETY RESTRAINT SYSTEM

[75] Inventor: Christopher D. Meyer, Sterling Heights, Mich.

[73] Assignee: Allied Corporation, Morris Township, Morris County, N.J.

[21] Appl. No.: 925,711

[22] Filed: Oct. 30, 1986

[51] Int. Cl.⁴ .............................................. B60R 21/10
[52] U.S. Cl. ..................................... 280/801; 280/808
[58] Field of Search ......................... 280/808, 807, 801

[56] References Cited

U.S. PATENT DOCUMENTS

| | | | |
|---|---|---|---|
| 4,199,190 | 4/1980 | Lindblad | 297/468 |
| 4,213,638 | 7/1980 | Sacco et al. | 280/808 |
| 4,272,104 | 6/1981 | Cuny | 280/808 |
| 4,473,243 | 9/1984 | Ogawa | 280/808 |
| 4,480,853 | 11/1984 | Ando et al. | 280/808 |
| 4,568,106 | 2/1986 | Yokoyama | 280/807 |
| 4,568,107 | 2/1986 | Biviano | 280/808 |

Primary Examiner—John J. Love
Assistant Examiner—Kenneth R. Rice
Attorney, Agent, or Firm—Russel C. Wells; Markell Seitzman

[57] ABSTRACT

A quick disconnect three point safety restraint system for use in motor vehicles having a retractor means 18 forming one point of the safety restraint system, a receptacle 14 forming the second point and quick disconnect 34 slideably mounted on the webbing 20 is operable to secured to an anchor 22 mounted to the frame 42 of the vehicle for forming the third point of the safety restraint system. The quick disconnect 34 is a tongue 38 integrally connected to a webbing guide 40 and receivably connected to a receptacle 36 mounted on the anchor 30. When the seats 10 of the vehicle are to be removed, the quick disconnect 34 removes the webbing 20 from the vehicle and a seat back bracket 28 retains the webbing 22 to the seat 10. The receptacle 14 and the retractor 18 are securely mounted on the frame 12 of the seat 10.

2 Claims, 5 Drawing Figures

FIG.4
FIG.5
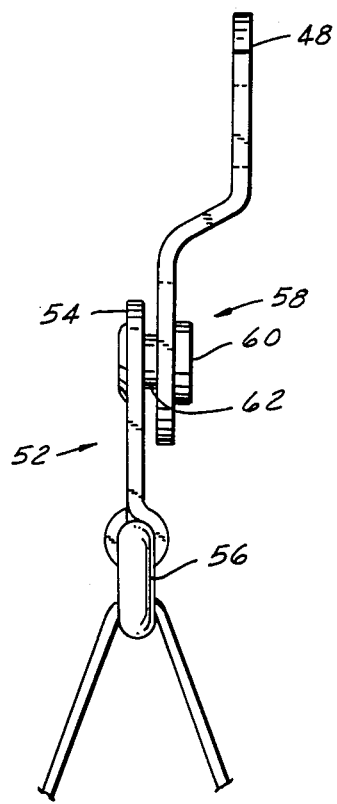
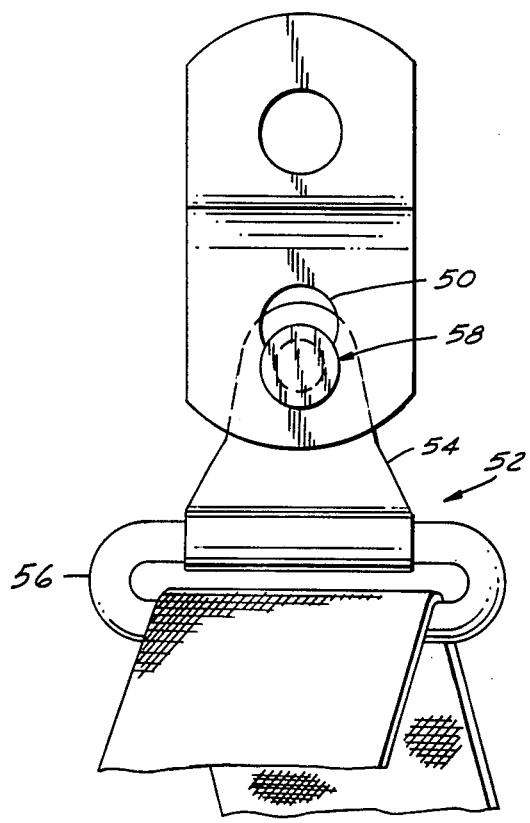

QUICK DISCONNECT THREE POINT SAFETY RESTRAINT SYSTEM

This invention relates to a quick disconnect three point safety restraint system for motor vehicles and in particular to a disconnect connected to the roof structure of the vehicle for locating the "D" ring for the shoulder belt portion of the restraint system.

BACKGROUND OF THE INVENTION

In multipurpose vehicles such as passenger vans which are convertible to cargo vans, the vehicle operator must be able to remove the rear seats to provide the cargo space. It is anticipated that motor vehicle regulations will require that the rear seat passengers sitting adjacent the sides of the vehicle have shoulder belts available to them.

In order to remove the seats, the means for fastening the seat belts to the floor and/or the frame of the vehicle must also be removed. To remove the shoulder belts, the fasteners anchoring the belts to the vehicle must also be removed. This makes the job of conversion much more difficult.

It is therefore a principle advantage of the invention to provide a convenient and quick means to disconnect the safety restraint system from a motor vehicle. It is a further advantage to provide a quick disconnect disconnect system for the outboard seating positions of all seating positions behind the front seats wherein such quick disconnect system operates to keep the safety restraint systems with the seats during and after removal.

SUMMARY OF INVENTION

A quick disconnect three point safety restraint system for use in motor vehicles having a retractor means forming one point of the safety restraint system and containing a spool of webbing having one end thereof connected to a vehicle seat frame, buckle means forming a second point of the safety restraint connected to the vehicle seat frame and spaced from said retractor means, and an adjustable tongue means slideably positioned on the webbing, said system characterized in that an anchor means is mounted to the vehicle frame in such a position to function as the pivot position for the webbing, said anchor means including a quick disconnect means having one side of said disconnect means secured to the vehicle and the other side of said disconnect means includes a webbing guide for providing the pivot for the webbing, said disconnect means operable to detach the webbing from said vehicle.

Many other advantages and purposes of the invention will be clear from the following detailed description of the drawings and of the invention.

BRIEF DESCRIPTION OF THE DRAWINGS

In the drawings:
FIG. 4 is a side view of the anchor and disconnect means of another embodiment.
FIG. 5 is a front view of FIG. 4.

DETAILED DESCRIPTION OF THE PREFERRED EMBODIMENT

Figure 2:
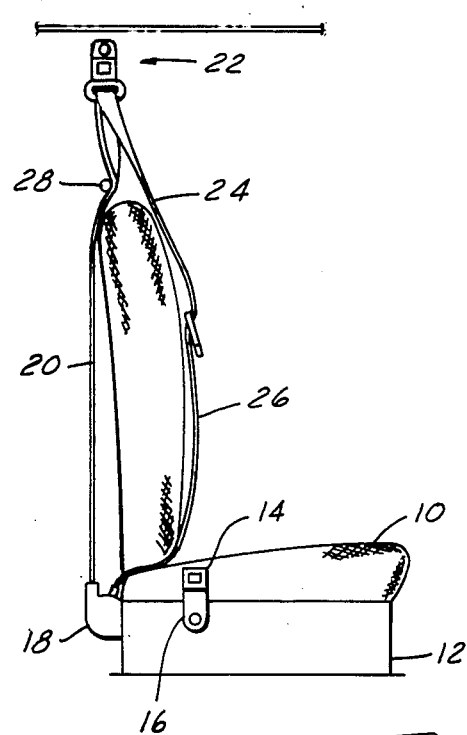
FIG. 2 is a side view of the FIG. 1.
Figure 1:
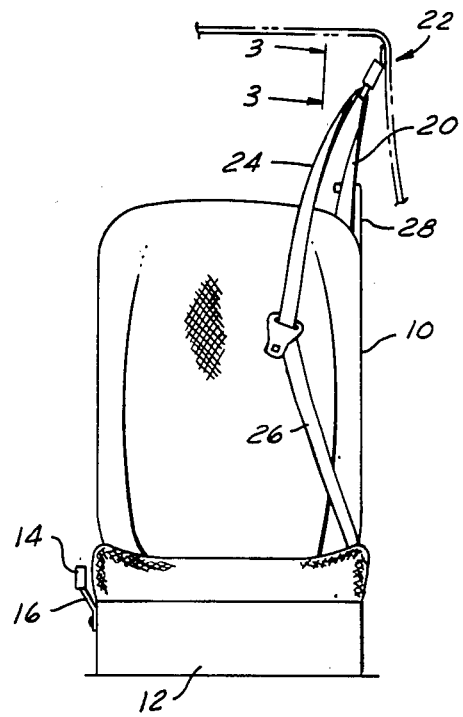
FIG. 1 is a front view of a seating position in a motor vehicle utilizing the invention hereof.

Referring to the FIGURES by the characters of reference, there is illustrated in FIGS. 1 and 2 the front and side view of a seat 10 as may be found in some styles of motor vehicles such as vans. In particular, the arrangement shown may represent the outboard seating of any of the seating positions behind the driver's seat, since the driver's seat is generally not removable. Even though the seating position is shown as a single seat, it may represent one seating position on a bench seat.

The utility feature of the van is the ability to remove the various passenger seats to form a cargo area within the van. At the present time, the various anchors of the safety restraint system or the seat belt system are secured by bolts to the frame or the floor of the vehicle. When the seat 10 is to be removed, either the belts are removed from the seats 10 and left to lie on the floor and as a result they get dirty or the bolts are removed from the frame or the floor and the seats 10 belts are removed from the vehicle. In either case, the belt system may not be properly or completely replaced when the seats 10 are reinstalled.

In FIG. 1, there is shown a seat position mounted on a seat frame 12 which is secured to the vehicle frame or floor by bolts which are not shown. Attached to the seat frame 12, typically along one side, is a receptacle 14 supported by some means such as a wire cable 16 as illustrated in U.S. Pat. No. 4,199,190 issued on Apr. 22, 1980, to Lindblad and entitled "Device for Use in Connection With Safety Belts", which is incorporated herein by reference. On the opposite side of the seat frame 12 or as shown on the rear side of the frame, there is secured a seat belt retractor 18 having a spool of webbing 20 attached thereto.

The FIGURE illustrates a typical three point seat belt system. The three points for securing the system are the retractor 18, the receptacle 14, and the pivot point 22. As is well known, when a person sits on the seat 10 and uses the restraint system, there is a shoulder belt portion 24 of the webbing 20 extending from the pivot point 22 over one shoulder of the passenger to the receptacle 14 at the seat level below the other shoulder and a lap belt portion 26 extending from the retractor 18 to the receptacle 14.

In addition and in order to contain the webbing 20 of the restraint system on the seat 10, a guide or bracket 28 is mounted on the back of the seat 10 functioning to keep the webbing 20 against the rear of the seat 10 as illustrated in FIG. 2. Except for the placement of the retractor 18 and the receptacle 14, the system illustrated is a conventional three point safety restraint system as found in most motor vehicles.

Figure 3:
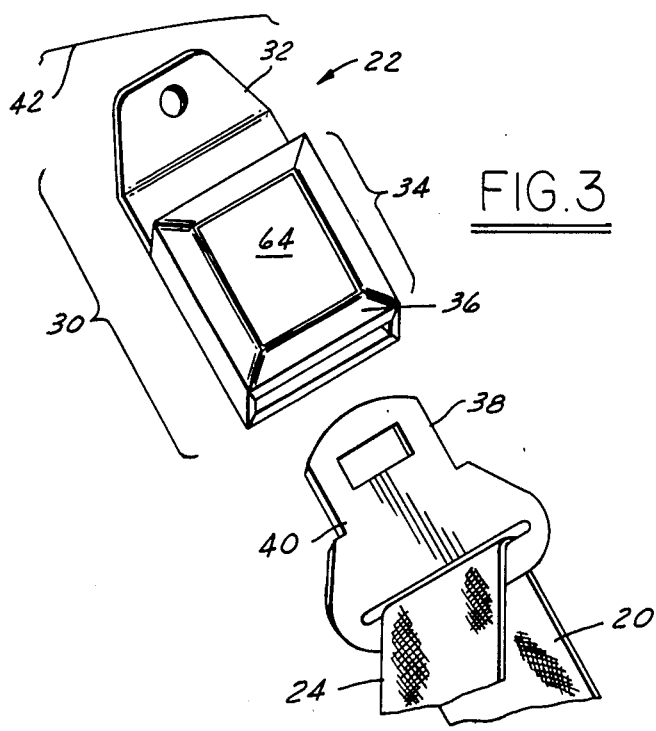
FIG. 3 is an illustration showing the preferred embodiment of the invention hereof and is a view in the direction of arrow 3—3 of FIG. 1.

Referring to FIG. 3, there is illustrated the preferred embodiment of the quick disconnect three point safety restraint system. FIG. 3 is taken in the direction of the arrow 3—3 on FIG. 1. FIG. 3 illustrates an anchor means 30 comprising a bracket 32 to which is secured a quick disconnect means. The quick disconnect means comprises a receptacle 36, a tongue means 38 and a webbing guide means 40.

The bracket 32 is secured to the roof frame 42 by means of a bolt which is not shown. In a typical finished assembly, the bolt means is covered by a decorative cover. Secured to the bracket 32 is a receptacle 36 such as may found in seat belt systems. The receptacle 36 is adapted to receive a tongue means 38 and is operable to secure the tongue means 38 therein. For safety reasons, the receptacle 36 of the quick disconnect means and the receptacle 14 from the lap belt are different so that they can not be interchanged.

As illustrated, the webbing guide means 40 comprises a "D" ring slidingly positioned on the webbing 20. The "D" ring is secured to the tongue means 38 in an integral fashion. In addition as illustrated in FIG. 3, an anti-noise or anti-rattle mechanism 44 comprising a spring biased bumper 46 operates to keep the tongue means 38 and receptacle 36 in a "tension" mode by having the bumper being biased into contact with the receptacle 36. This takes the play out of the receptacle 36 locking mechanism.

The "D" ring is coated with a substance such as teflon in order that the webbing 20 may pass between the guide edges of the "D" ring in a smooth and easy manner. In normal operation, the tongue means 38 is inserted and remains in the receptacle 36. It is not removed unless the seats 10 are to be removed as discussed previously.

FIGS. 4 and 5 illustrate an alternate embodiment of the quick disconnect three point safety restraint system. In this embodiment, the bracket means 48 has a keyhole-shaped aperture 50 into which a webbing guide means 52 is secured. The webbing guide means 52 comprises a bracket 54 secured to a "D" ring at one end and a "T" shaped post means 58 attached at the other end. The upper part of the keyhole aperture 50 has a diameter which is larger than the cross arm 60, which is typically disk shaped, of the "T" shaped post means 58. The lower part of the keyhole aperture 50 has a width which is smaller than the cross arm 60 of the "T" shaped post means 58 but slightly larger than the diameter of the post portion 62 of the post means. When the seat 10 is to be removed, the webbing guide means 52 is moved to such a position that the post means 58 is contained in the upper part of the keyhole aperture 50 and the cross arm 60 of the post means is passed through the keyhole aperture 50. When the seat 10 is reinstalled, the process is reversed and the cross arm 60 of the post means 58 is put into the upper part of the keyhole aperture 50 and moved to the lower part of the keyhole aperture 50.

In both embodiments, the bracket 28 on the back of the seat 10 operates to contain the webbing 20 on/with the seat 10. When the quick disconnect means 34 is operated, the retractor 18 rewinds the webbing 20 until the webbing 20 lies over the back of the seat 10.

In order to complete the quick disconnect safety restraint system, both the retractor 18 means and the lap belt receptacle 14 means are securely mounted to the seat frame 12. Thus, when the seat 10 is to be removed, the only connection for the three point safety restraint system that must be removed is at the pivot point 22. The other two points are securely connected to the seat frame 12 and are removable therewith. The pivot point 22 is removed by pushing in the button 64 on the receptacle 36 and at the same time pulling on the tongue means 38 in a direction to separate the two parts.

Many changes and modifications in the above described embodiment of the invention can, of course, be carried out without departing from the scope thereof. Accordingly, that scope is intended to be limited only by the scope of the appended claims.

I claim:

1. In a motor vehicle wherein non-driver seats are removable from the vehicle, a quick disconnect three point safety restraint system adapted to be removed with each seat and contained therewith, said system comprising:

a retractor means forming one point of the safety restraint system and containing a spool of webbing;

buckle means forming a second point of the safety restraint system spaced from said retractor means;

said retractor means and said buckle means being connected to the seat frame of the removal seats;

a bracket means mounted on the back of the removable seat for retaining said webbing along the rear surface of the seat;

an adjustable tongue means slideably positioned on the webbing;

an anchor means mounted to the vehicle frame in such a position to function as the third point of the safety restraint system, said third point being a pivot position for the webbing; and a quick disconnect means including a receptacle mounted on said anchor means and a tongue means for mating with said receptacle including a "D" ring having a smooth coated surface for slidingly receiving the webbing for providing the pivot for the webbing, said disconnect means operable to detach the safety restraint system from said vehicle when the removable seats are removed from the vehicle.

2. A quick disconnect three point safety restraint system according to claim 1 wherein said anchor means is a bracket member having means for fastening said bracket at one end thereof to said vehicle and having a keyhole aperture at said other end and said quick disconnect means has a tongue means integrally connected at one end thereof to said webbing guide means and having a "T" shaped post member at the other end, said "T" shaped post member insertable in said keyhole aperture and retained therein between said tongue means and the cross arm of said "T" shaped post member.

* * * * *